US006467833B1

United States Patent
Travers (10) Patent No.: US 6,467,833 B1
(45) Date of Patent: Oct. 22, 2002

(54) DRAG REDUCER (75) Inventor: Richard H. Travers, Warren, VT (US)

(73) Assignee: R. H. Travers Company, Warren, VT (US)

( * ) Notice: Subject to any disclaimer, the term of this patent is extended or adjusted under 35 U.S.C. 154(b) by 0 days.

(21) Appl. No.: 09/965,067

(22) Filed: Sep. 27, 2001

(51) Int. Cl.[7] .............................................. B20D 35/00
(52) U.S. Cl. ................................ 296/180.4; 296/180.1; 296/180.5
(58) Field of Search ........................... 296/180.4, 180.5, 296/180.1; 105/1.1

(56) References Cited

U.S. PATENT DOCUMENTS

| 2,737,411 A | 3/1956 | Potter |
| 3,425,740 A | 2/1969 | DeVaughn |
| 4,006,932 A | 2/1977 | McDonald |
| 4,030,779 A | 6/1977 | Johnson |
| 4,142,755 A | 3/1979 | Keedy |
| 4,236,745 A | 12/1980 | Davis |
| 4,257,641 A | 3/1981 | Keedy |
| 4,451,074 A | 5/1984 | Scanlon |
| 4,458,936 A | 7/1984 | Mullholland |
| 4,601,508 A | 7/1986 | Kerian |
| 4,682,808 A | 7/1987 | Bilanin |
| 4,688,841 A | 8/1987 | Moore |
| 4,702,509 A | 10/1987 | Elliott, Sr. |
| 4,741,569 A | 5/1988 | Sutphen |
| 4,818,015 A | 4/1989 | Scanlon |
| 4,978,162 A | 12/1990 | Labbe |
| 5,058,945 A | 10/1991 | Elliott, Sr. et al. |
| 5,236,347 A | 8/1993 | Andrus |
| 5,498,059 A | 3/1996 | Switlik |
| 5,823,610 A | 10/1998 | Ryan et al. |
| 6,092,861 A | 7/2000 | Whelan |
| 6,309,010 B1 * | 10/2001 | Whitten .................. 296/180.4 |

* cited by examiner

Primary Examiner—Joseph D. Pape
(74) Attorney, Agent, or Firm—Iandiorio & Teska (57) ABSTRACT A drag reducer including a frame hinged to the rear of a vehicle and operable between a position adjacent the rear of the vehicle and a position swung away from the rear of the vehicle to allow access to the rear of the vehicle, and an inflatable bag attached to the frame, operable between a deployed inflated configuration and a stowed deflated configuration, the inflatable bag including at least two converging panels defining an aerodynamic drag reducing structure in the deployed inflated configuration.

35 Claims, 8 Drawing Sheets

DRAG REDUCER

FIELD OF THE INVENTION

This invention relates to a drag reducer and more particularly to a drag reducer for use on the rear of a vehicle such as a tractor trailer truck.

BACKGROUND OF THE INVENTION

The aerodynamic drag of the back end of a vehicle such as a tractor trailer truck, known as the "base drag," can comprise more than 20% of the vehicle's overall aerodynamic drag. Reducing the aerodynamic drag of a vehicle results in improved fuel efficiency and operational cost savings. While much attention has been given to reducing the front end drag of tractor trailers, this has only served to increase the proportion of the overall drag attributable to base drag.

In order to address base drag, a drag reducer must be large and streamlined enough to cause a significant portion of the airstreams along the top and sides of the trailer to remain in laminar flow at the back end of the vehicle without breaking down into turbulent flow and, therefore, causing increased drag. In addition, it is important that any drag reducer added to the back end of the trailer must allow easy access to the cargo area, so it must be easily stowed and moved out of the way of the cargo doors. Further, the drag reducer cannot be so long as to interfere with traffic. There is a plethora of art directed to drag reducers including U.S. Pat. Nos. 2,737,411; 3,425,740; 4,006,932; 4,030,779; 4,142,755; 4,236,745; 4,257,641; 4,451,074; 4,458,936; 4,600,508; 4,682,808; 4,688,841; 4,741,569; 4,702,509; 4,818,015; 4,978,162; 5,058,945; 5,236,347; 5,498,059; 5,823,610; and 6,092,861. This art, however, fails to teach or suggest a drag reducer structure which meets the requirements delineated above. Accordingly, prior art drag reducers have not achieved any market success.

SUMMARY OF THE INVENTION

It is therefore an object of this invention to provide a drag reducer for tractor trailer trucks and other vehicles.

It is a further object of this invention to provide such a drag reducer which is easily deployable and stowable.

It is a further object of this invention to provide such a drag reducer which allows easy access to the rear of the trailer or other vehicle.

It is a further object of this invention to provide such a drag reducer including a frame that is hinged to the rear of the vehicle and operable between a position adjacent the rear of the vehicle and a position swung away from the rear of the vehicle to provide access to the rear of the vehicle.

It is a further object of this invention to provide such a drag reducer including an inflatable bag attached to the frame and operable between a deployed inflated configuration when the frame is positioned adjacent the rear of the vehicle and a deflated stowed configuration both when the frame is adjacent the rear of the vehicle and also when the frame is swung away from the rear of the vehicle.

It is a further object of this invention to provide such a drag reducer wherein the inflatable bag includes at least first and second converging panels defining an aerodynamic drag reducing structure in the deployed inflated configuration and the first panel is foldable over the second panel in the deflated stowed configuration.

The invention results from the realization that an improved drag reducer can be achieved by attaching a drag reducing tail to the rear of the trailer such that the drag reducer has sufficient rigidity when deployed to maintain a stable shape that causes a laminar flow of the air converging behind the vehicle and by engineering the tail to be easily stowable and quickly moved away from the cargo doors to allow access to the cargo area.

This invention features a drag reducer including a frame hinged to the rear of a vehicle and operable between a position adjacent the rear of the vehicle and a position swung away from the rear of the vehicle to provide access to the rear of the vehicle. An inflatable bag is attached to the frame and operable between a deployed inflated configuration when the frame is adjacent the rear of the vehicle and a stowed deflated configuration when the frame is adjacent the rear of the vehicle and when the frame is swung away from the rear of the vehicle. The inflatable bag includes at least first and second converging panels that define an aerodynamic drag reducing structure in the deployed inflated configuration. The first panel is foldable over the second panel in the deflated stowed configuration to control the bag in the stowed deflated configuration and to assist configuring the bag in the stowed deflated configuration.

In a preferred embodiment, the inflatable bag is unitary in construction. The inflatable bag may also include an inflatable bladder surrounded by a covering. The first panel may include battens framing the first panel. The battens may be flexible along their longitudinal axis and inflexible off axis.

The frame may have four sides and the bag may have a top panel, a bottom panel and two side panels, one side panel extending from the hinge side of the frame and being foldable over the other side panel, the top panel and the bottom panel. The panels converge at a distal portion of the bag. The bag may also include a base panel spanning the frame to form a proximal portion of the bag adjacent the vehicle.

The frame may be hinged to the side of the rear of the vehicle. There may be a plurality of hinges and the hinges may be double hinges.

The drag reducer may include a fill port for inflating the bag and means for automatically inflating the bag.

The first panel may be biased into a folded position. There may be at least one spring member connected to the first panel to bias it in the folded position. Indeed, all of the panels may be biased into a folded position. Thus, there may be a spring member connected to the top panel to bias it downward, a spring member connected to the bottom panel to bias it upward and a spring member connected to each of the first and second panels to bias them inward.

There may also be a skirt connected to the frame to provide stress relief for the inflatable bag. Typically, the first panel has a length equal to or less than the extent of the frame.

There is also provided a drag reducer including a four sided frame having one side hingeable to the rear side of a vehicle and operable between a position adjacent the rear of the vehicle and a position swung away from the rear of the vehicle to provide access to the rear of the vehicle. The drag reducer includes an inflatable bag attached to the frame and operable between a deployed inflated configuration when the frame is adjacent the rear of the vehicle and a stowed deflated configuration when the frame is adjacent the rear of the vehicle and when the frame is swung away from the rear of the vehicle. The inflatable bag includes panels which extend outward from the frame and converge at a distal portion defining an aerodynamic drag reducing structure. One panel is a dominant panel and is biased to fold over the other panels so that when the bag is deflated it is automatically self-stowing.

In a preferred embodiment, there may be a top panel, a bottom panel and two side panels, one of which is the dominant panel. The dominant panel may extend from the hinged side of the frame. There may be at least one spring member connected to the dominant panel to bias it in the folded position. There may also be spring members connected to the top, bottom and non-dominant side panels to bias them into the folded position under the dominant panel.

The dominant panel may have a length equal to or less than the extent of the frame. The dominant panel may be framed by batten members, and the batten members may be flexible along their longitudinal axis and inflexible off axis.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1A:
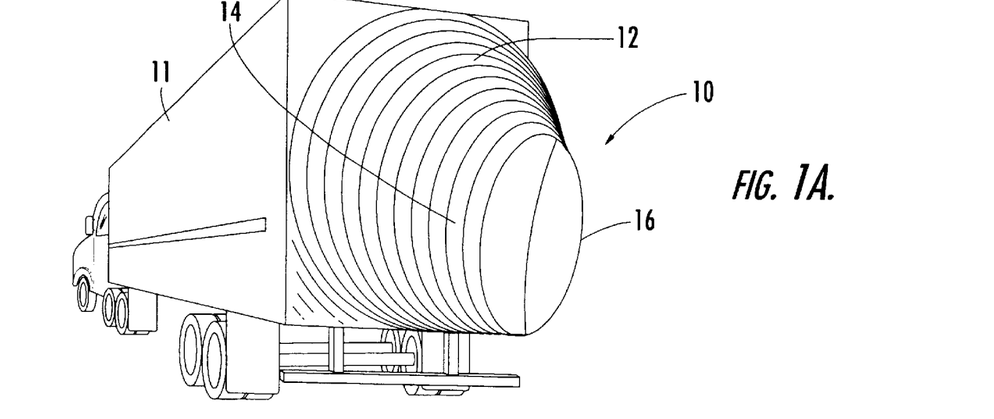
FIGS. 1A–1E are perspective drawings of a drag reducer according to the present invention attached to a tractor trailer, in various deployed and stowed positions.
Figure 1B:
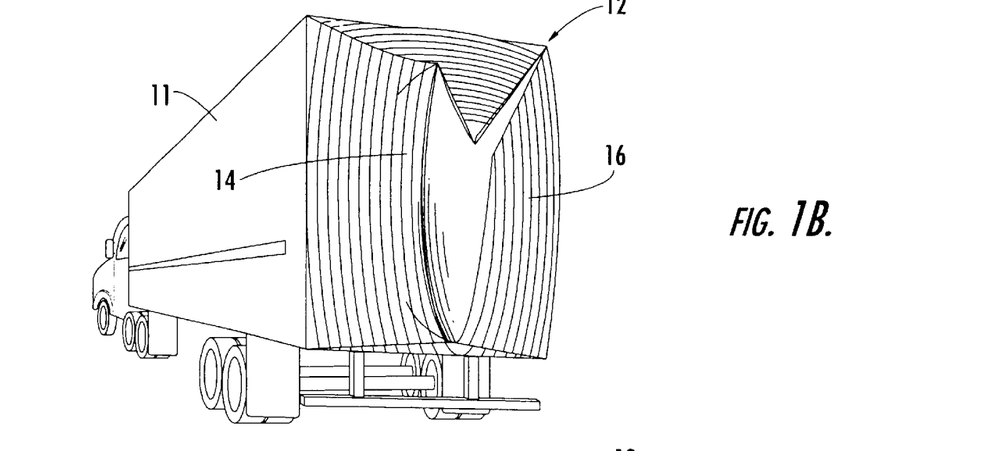
Figure 1C:
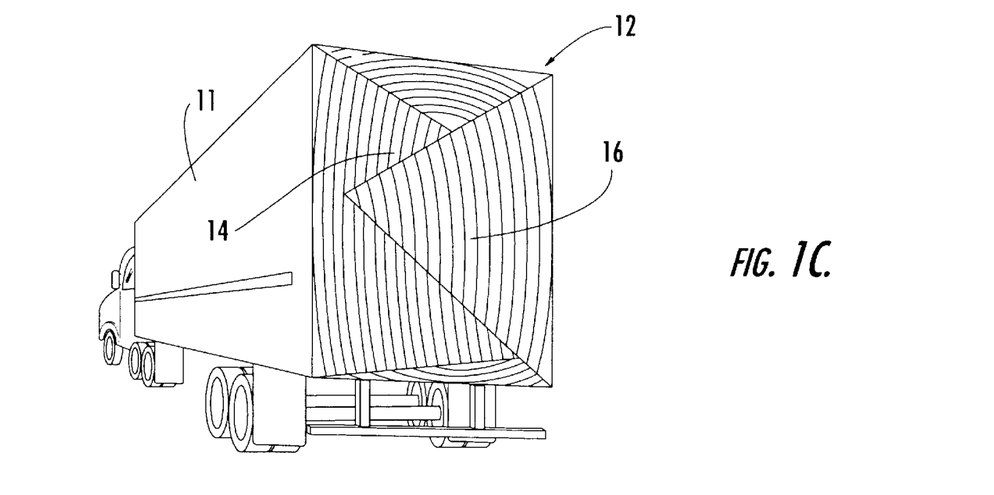
Figure 1D:
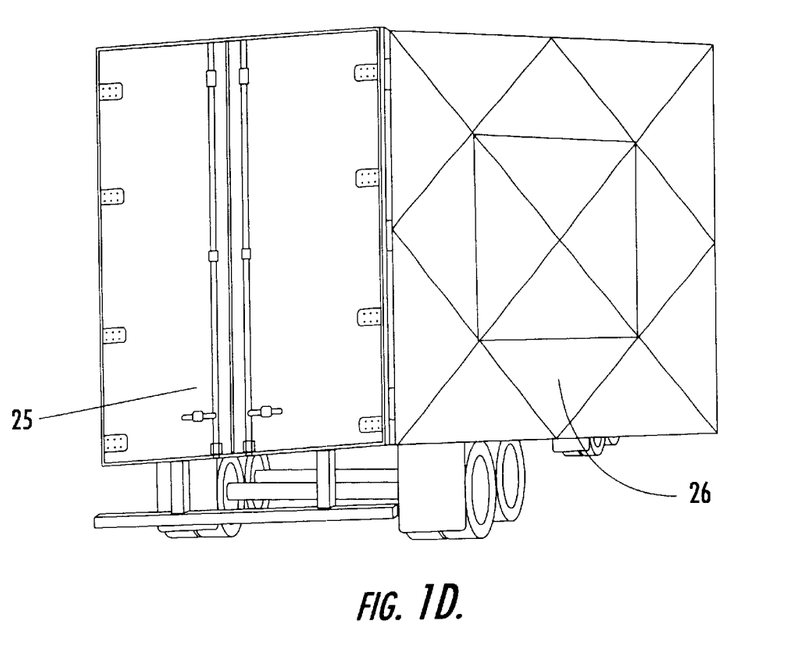
Figure 1E:
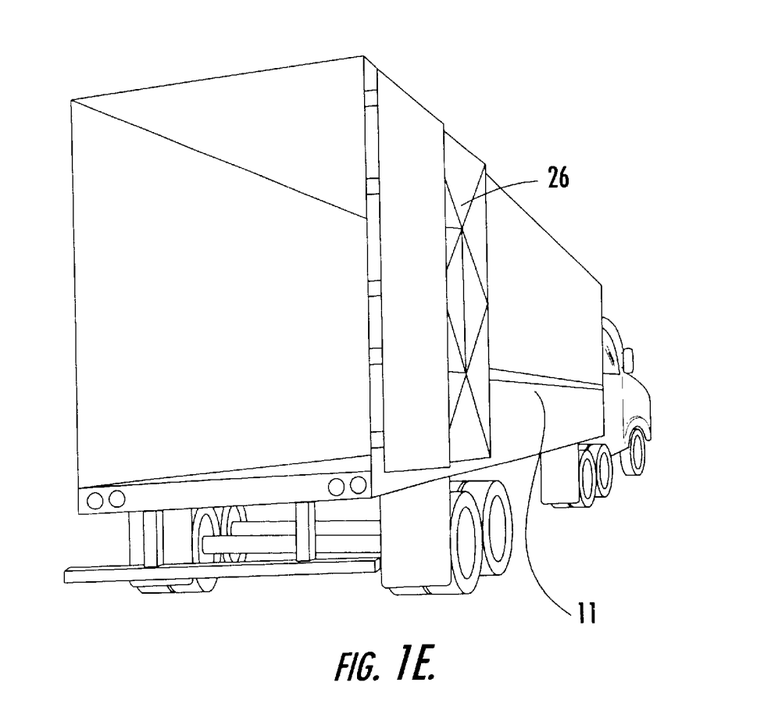

Drag reducer 10, FIGS. 1A–1E includes a frame 26 hinged to the rear of vehicle 11 (in this example a tractor trailer truck) and operable between a position adjacent to the rear of the vehicle as shown in FIGS. 1A–1C and a position swung away from the rear of the vehicle as shown in FIGS. 1D and 1E thereby providing access to the rear 25 (here the cargo doors) of the vehicle. Inflatable bag 12, FIGS. 1A–1C is attached to frame 26 and operable between a deployed inflated configuration as shown in FIG. 1A when frame 26 is positioned adjacent the rear of the vehicle and a stowed deflated configuration both when the frame is positioned adjacent the rear of the vehicle as shown in FIG. 1C and also when the frame is swung away from the rear of the vehicle as shown in FIGS. 1D and 1E. Inflatable bag 12 preferably has at least first 16 and second 14 converging panels defining an aerodynamic drag reducing structure in the deployed inflated configuration (see FIG. 1A). First panel 16 is foldable over second panel 14 when bag 12 is in the deflated stowed configuration, as shown in FIG. 1C. This structure controls bag 12 in the deflated stowed configuration and also assists in configuring the bag in the partially deflated configuration as shown in FIG. 1B.

Figure 2:
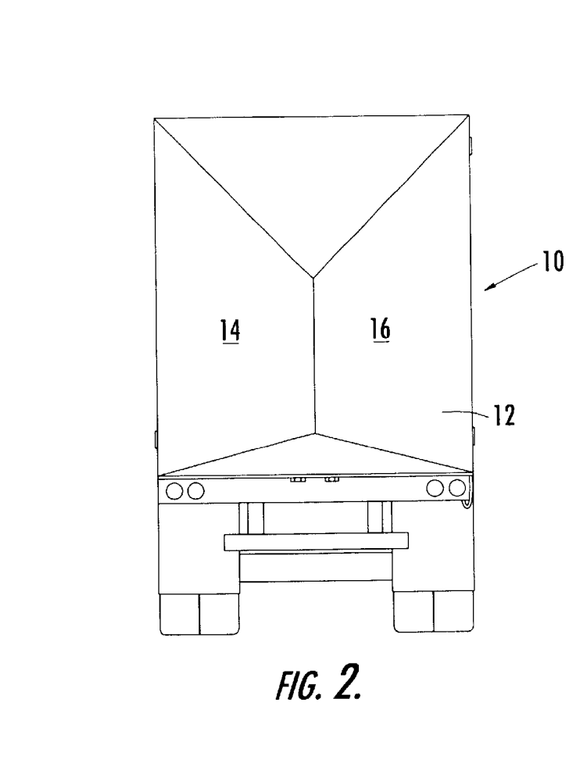
FIGS. 2–7 are rear plan views of the drag reducer according to the subject invention, showing various deployed and stowed positions.

In the deployed inflated position, panels 14 and 16 converge at a distal portion 40, FIG. 2, to define an aerodynamic drag reducing structure which maintains laminar flow of the airstreams flowing along the sides and top of trailer 11, thereby reducing the base drag of trailer 11. In the partially deflated position, FIG. 3, drag reducer 10 is shown partially deflated, with left side panel 14 collapsed somewhat under right side panel 16. When fully deflated, FIG. 4, left side panel 14 is completely folded beneath right side panel 16. Panel 16 is typically designed to have a length equal to or less than the extent of frame 26, FIG. 5.

Figure 5:
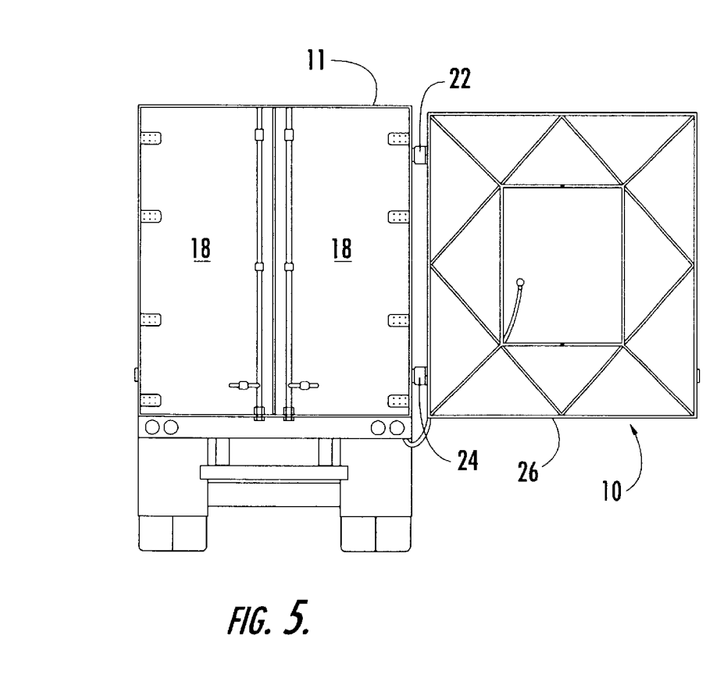
Figure 6:
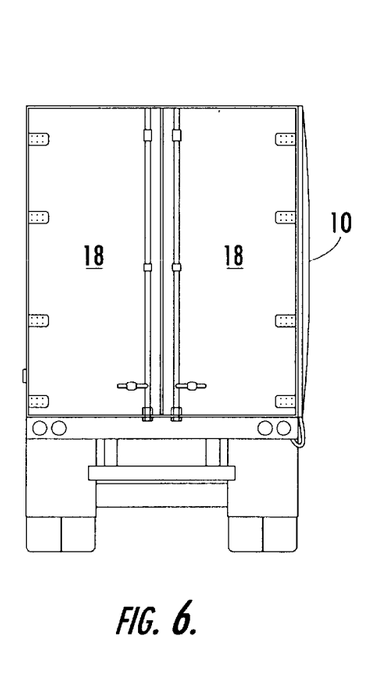
Figure 7:
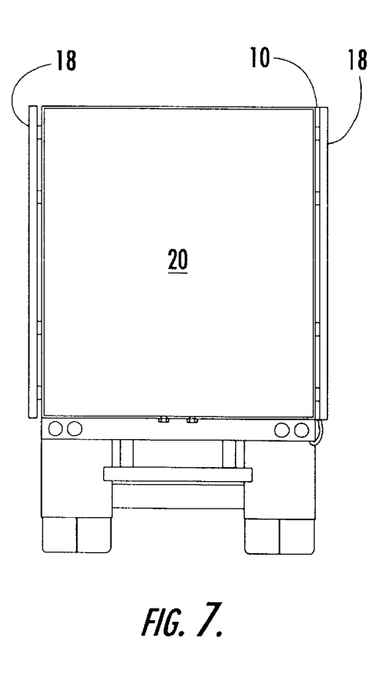

To gain access to cargo doors 18, FIG. 5, frame 26 is attached to trailer 11 by hinges 22, 24 such that drag reducer 10 can be swung clear of doors 18. Drag reducer 10 is hinged such that it can be swung completely to the side of trailer 12, FIG. 6, allowing doors 18 to be fully opened for easy access to cargo area 20, FIG. 7. Hinges 22, 24 may each include two parallel hinge pins. The purpose of such a double hinge configuration is to allow drag reducer 10 to be swung around the corner of trailer 11 to a position which is forward enough to allow door 18 on that side of the trailer to be opened as fully as possible if drag reducer 10 were not attached to the trailer as shown in FIG. 7. In an alternative embodiment, hinges 22, 24 may be replaced by a continuous double hinge (not shown) running the entire length of frame 26.

Figure 3:
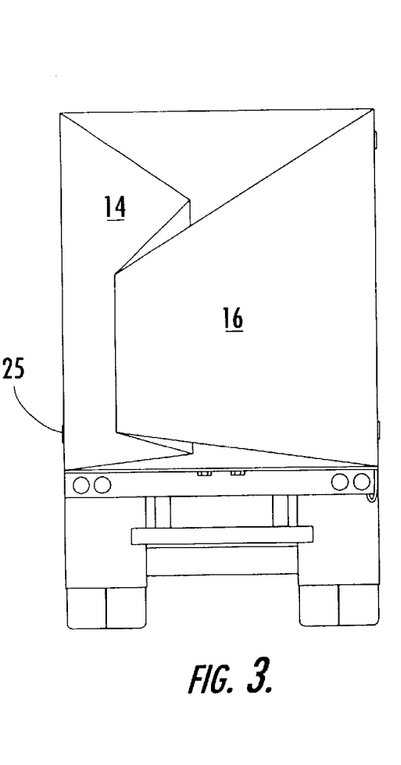
Figure 4:
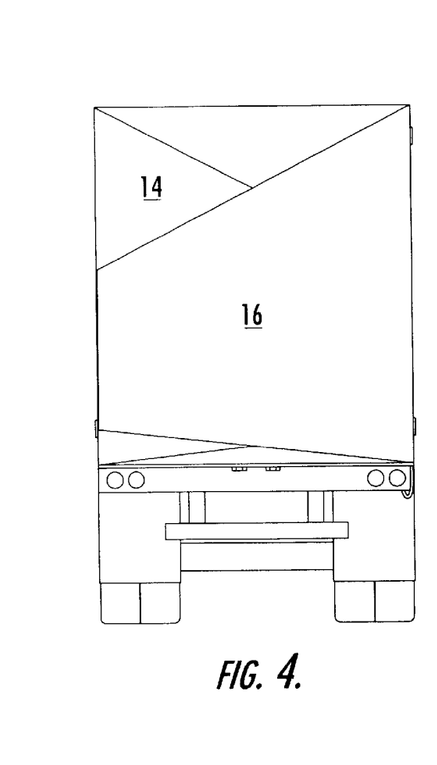

On the side of the frame 26 opposite hinges 22, 24, is a latch mechanism 25, FIG. 3, to securely attach the frame 26 to the rear of the truck. When the frame is latched onto the truck, there may also be a padlock (not shown) and/or a simple wire cable or safety harness (not shown), connecting the frame to an attachment point on the truck, trailer or its doors, that has enough slack to allow for locking and unlocking. There would not be enough slack, however, to let the frame separate from the back end of the truck far enough to pose a problem for nearby traffic, if the frame became or were left unlatched from the truck while the truck was moving.

Figure 8:
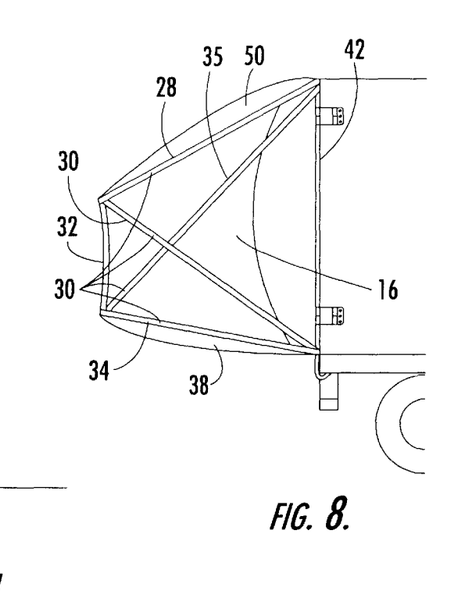
FIGS. 8–14 are side plan views of the drag reducer of this invention, showing various deployed and stowed positions.

Battens 28, 30, 32, 34, and 35, FIG. 8, may be used to frame panel 16. Panel 16 is the dominant panel in that panel 16 folds on top of panel 14 and any other panels which are part of inflatable bag 12. Battens 28, 30, 32, 34, and 35 are typically flexible along their longitudinal axes and inflexible off axis. This framework of battens is securely hinged to frame 26 in order to support the partially deflated bag 12 and prevent bag 12 from sagging. There may also be battens in other panels, particularly panel 14, which help stabilize the bag when it is in the deflated stowed configuration. Additionally, there may be battens attached to base panel 42 or to the inflatable bladder, if one is used as described in more detail below, such that the upper corners of the bladder are kept in close proximity to the upper frame corners in the deflated stowed configuration.

Inflatable bag 12 may include top panel 36 and bottom panel 38, FIG. 8, in addition to side panels 14 and 16, FIG. 1. Panels 14, 16, 36 and 38 converge at a distal portion 40 of bag 12. Side panel 16 folds over panels 14, 36 and 38. Base panel 42, FIG. 8, may be included to span frame 26 and form a proximal portion of bag 12 adjacent the trailer.

Figure 16:
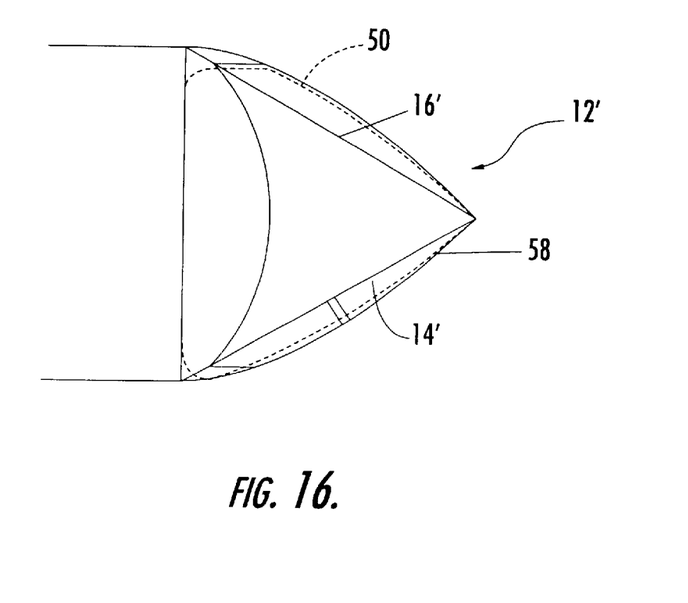
FIG. 16 is a top view of a drag reducer of this invention including an inflatable bladder.

Inflatable bag 12 may be unitary in construction. Alternative inflatable bag 12', FIG. 16, may include an inflatable bladder 50, surrounded by covering 58. Inflatable bag 12, inflatable bladder 50 and covering 58 may be made with an outer material that is resistant to weather, UV light, road salt, oil and abrasion and is readily cleaned. While covering 58 need not be airtight, inflatable bag 12 and bladder 50 should be airtight and capable of holding up to 10 psi of internal pressure. Inflatable bag 12 and bladder 50 may be made of a non-elastic re-enforced film that can be made airtight by use of radiofrequency or ultrasonic welding. Bag 12 or bladder 50 should each have a definite size and rigid shape that does not expand after being filled with air, as such expansion could overly stress and deform frame 26. One suitable material for covering 58 would be Dacron® marine fabric.

Figure 9:
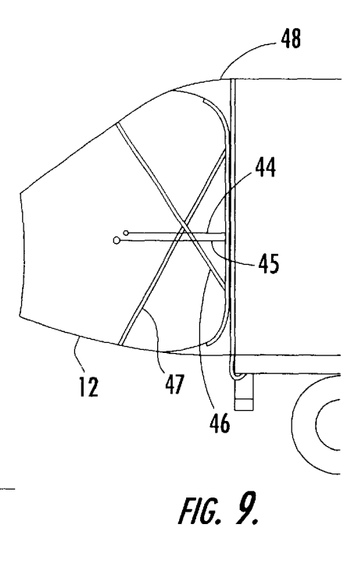
Figure 10:
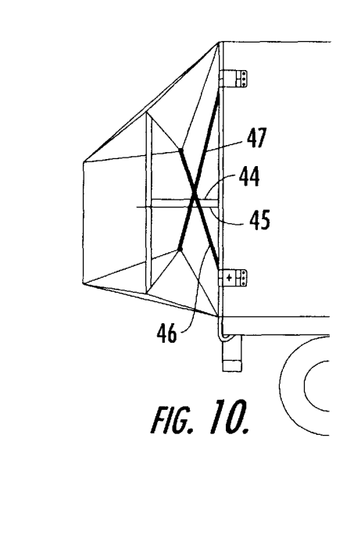

Panel 16 is preferably biased into a folded position: biasing or spring member 45, FIGS. 9 and 10, may be attached to panel 16 such that, as bag 12 is deflated, panel 16 folds over the other panels. There may also be biasing or spring members 44, 46, 47 attached to panels 14, 36, 38, respectively, to bias them into the folded position. For example, biasing member 44 may be attached to side panel 14 to bias it inward, biasing member 46 may be attached to top panel 36 to bias it downward, and biasing member 47 may be attached to bottom panel 38 to bias it upward. Spring members 44,45,46,47 may be elastic cords, springs or any other suitable construction to allow for biasing the various panels into the folded position. Skirt 48, FIG. 9, may also be attached to frame 26 and bag 12. Skirt 48 provides stress relief for bag 12. Spring members 44 and 45 may be one continuous spring member or may be two separate spring members. Similarly, spring member 46 and 47 may be one continuous spring member or may be two separate spring members.

For example, spring members 44 and 45 may be a single bungee cord. One end of the bungee cord is attached to a pull point on the side panel 14. This bungee passes through a base pull point on the frame 26 near the base of panel 16, changes direction, passes through a base pull point on the side of the frame 26 near the base of panel 14, changes direction again, and is attached at the other end to a pull point on panel 16. Similarly, spring members 46 and 47 may be a single bungee cord. One end of this bungee cord is attached to a pull point in the middle of the bottom panel 38. It passes through an upper pull point on frame 26, and then through a lower pull point on frame 26, changing direction at each. The other end of this bungee cord is attached to a pull point in the middle of the top panel 36. When the bladder is inflated the pulling force of the bungees is overcome by the air pressure and they become fully extended. When the bladder begins to deflate the bungees supply the force that causes air to flow out of any opening, and to maintain a taut exterior skin to the collapsing bladder and skirt. The ratio of the maximum stretched length of each bungee when the bladder is inflated to its more relaxed minimum stretched length when the bladder is folded is no more than 2 to 1.

Figure 11:
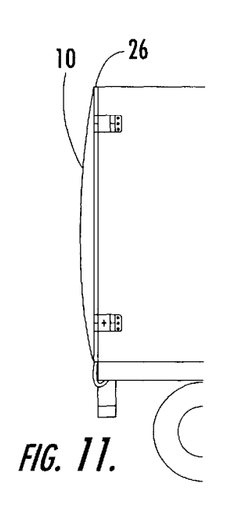
Figure 12:
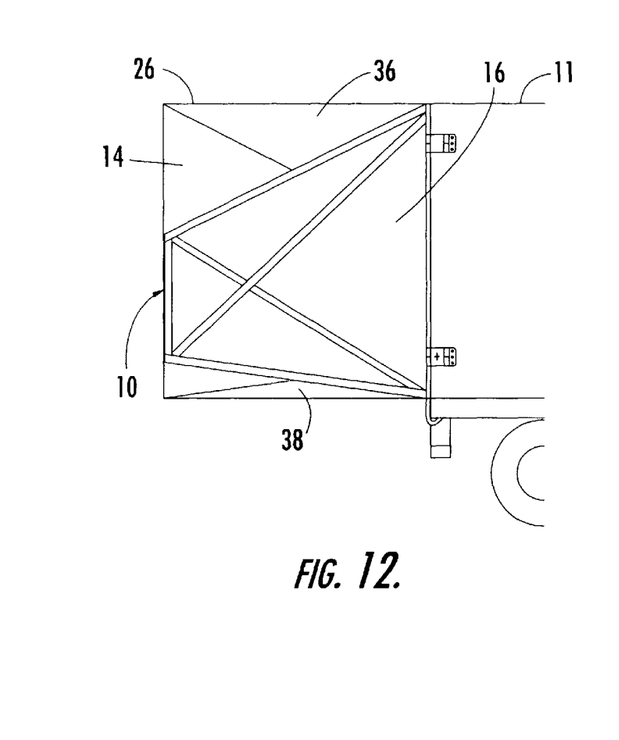
Figure 13:
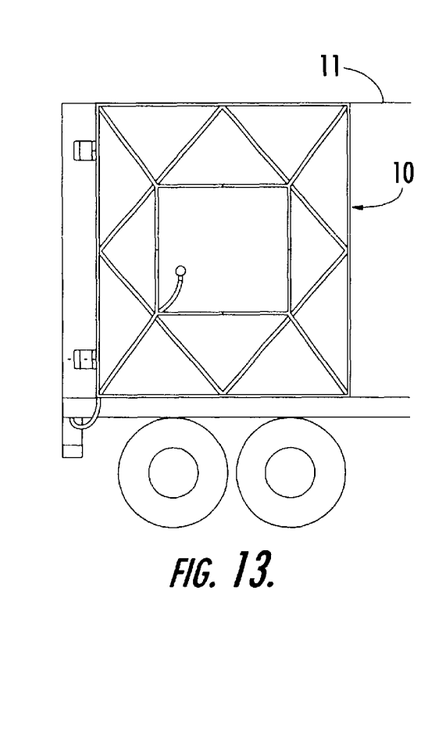
Figure 14:
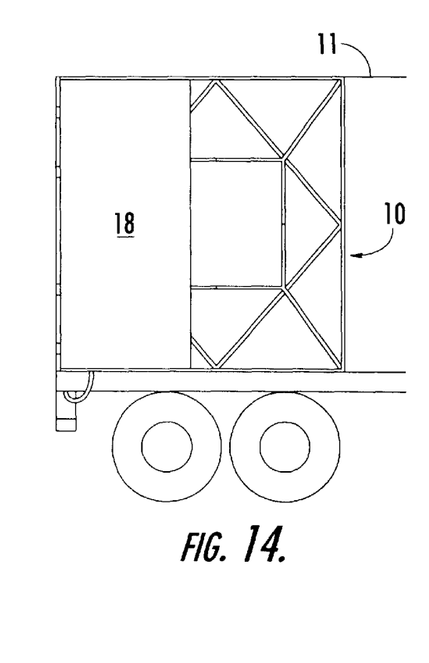

The stowed deflated position of drag reducer 10, FIGS. 11 and 12, is flat against frame 26. Panel 16, FIG. 12, is folded on top of panels 14, 36 and 38. This allows drag reducer 10 to be swung away from the rear of the trailer as shown in FIG. 12. Drag reducer 10 is then swung around to the side of trailer 11, FIG. 13, such that the cargo door on that side of the trailer may be opened fully, FIG. 14.

Figure 15:
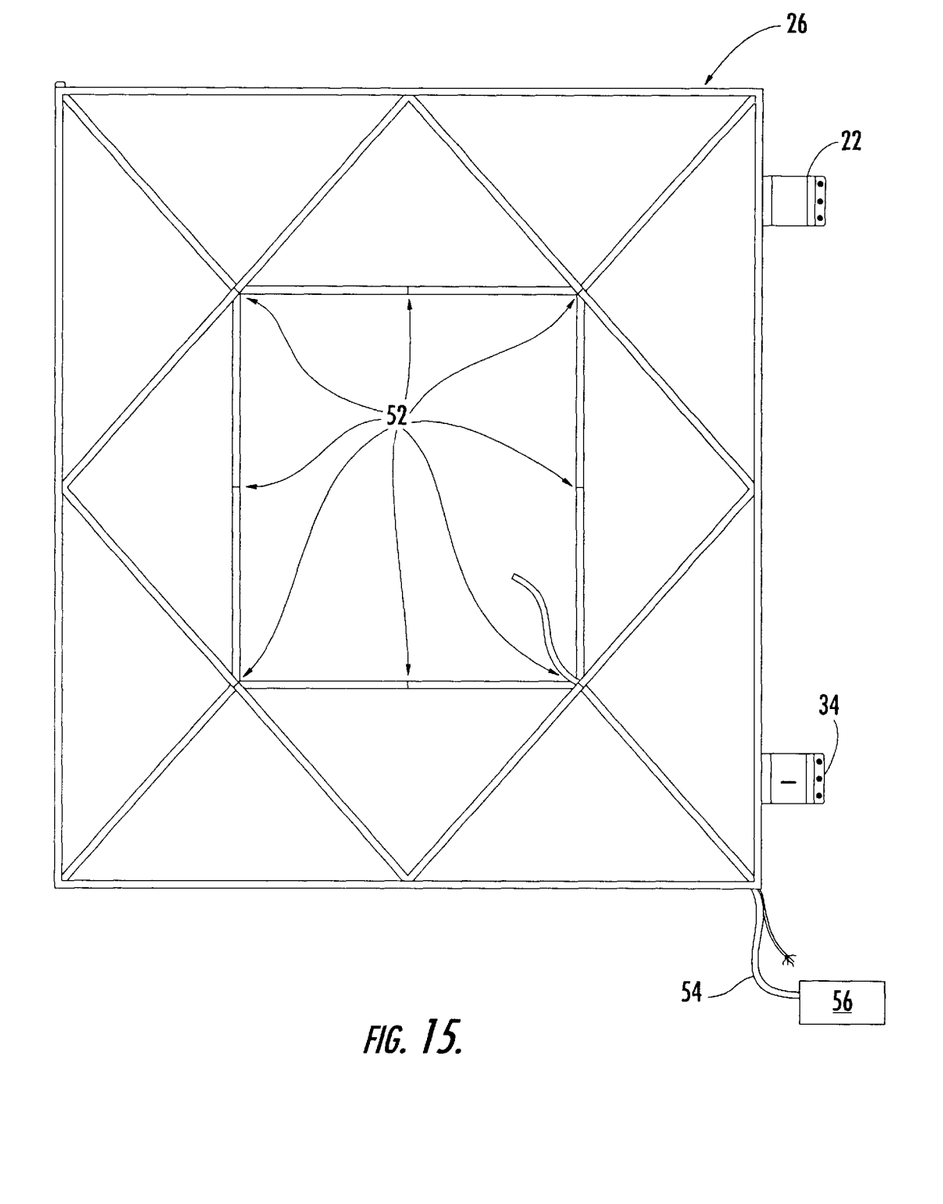
FIG. 15 is a detailed plan view of a frame for the drag reducer of this invention.

Frame 26, FIG. 15 is typically designed to be as wide as the body of trailer 11. The height of frame 26 is designed such that drag reducer 10 does not obstruct the brake signal or other safety lights and equipment located below doors 18. Frame 26 may be made of any suitably lightweight and rigid material. One preferred material is one inch square aluminum tubing. Frame 26 may be welded, bolted or otherwise connected together into a rigid framework. Bladder mounting points 52 may be provided for attaching the inflatable bladder to the frame. Fill tube 54 may be included for providing air to inflatable bag 12 or inflatable bladder 50, if it is utilized.

Air may be provided to the drag reducer in a number of ways. There may be a manual fill valve or fill port on the inflatable bladder for introducing air from a blower or air pump or a tire nozzle valve which can be connected to a source of compressed air. In a preferred method, fill tube 54, FIG. 15 is connected to automatic fill system 56. Automatic fill system 56 may include a reversible pump which may be controlled by a switch accessible in the cab of the vehicle. When it is desired to deploy the drag reducer, the pump is energized and pumps air into the inflatable bag. The pump may include a pressure sensor to monitor the pressure inside the bag and maintain it within a predetermined range. To undeploy the drag reducer, the pump is reversed to remove the air from the bag, thus allowing the bag to collapse into the stowed deflated configuration.

In this way, drag reducer 10, FIGS. 1A–1E is easily deployable and stowable. Drag reducer 10 also allows easy access to the rear of the trailer or other vehicle. Frame 26, FIGS. 1D–1E is hinged to the rear of the vehicle and operable between a position adjacent the rear of the vehicle and a position swung away from the rear of the vehicle to provide access to the rear of the vehicle. Inflatable bag 12, FIGS. 1A–1C is attached to the frame and operable between a deployed inflated configuration (FIG. 1A) when the frame is positioned adjacent the rear of the vehicle and a deflated stowed configuration both when the frame is adjacent the rear of the vehicle (FIG. 1C) and also when the frame is swung away from the rear of the vehicle (FIGS. 1D–1E). First 16, FIG. 1A and second 14 converging panels define an aerodynamic drag reducing structure in the deployed inflated configuration. But, first panel 16 is foldable over second panel 14 in the deflated stowed configuration (FIGS. 1B–1E).

Figure 17:
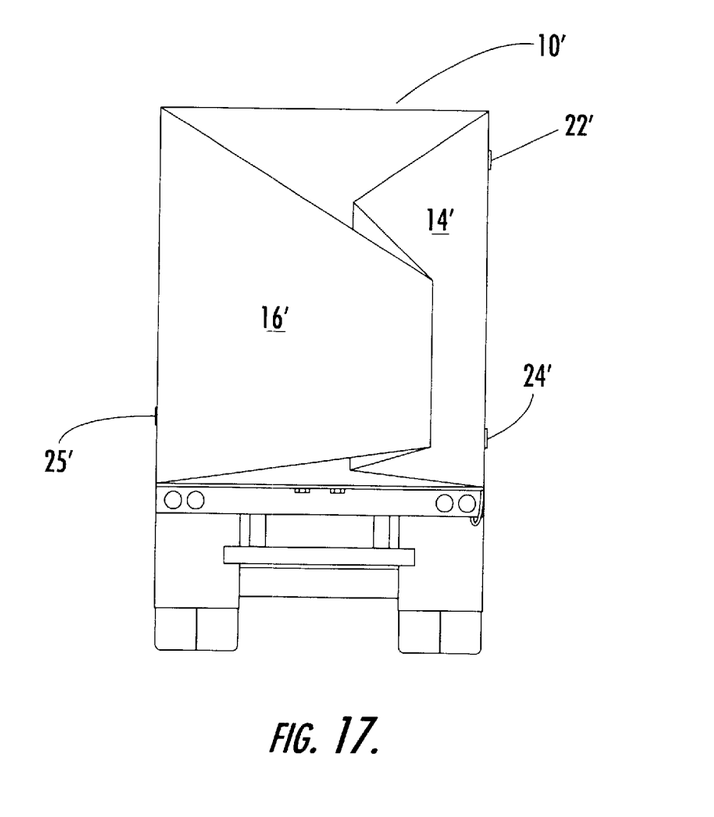
FIG. 17 is a rear plan view of an alternative embodiment of the drag reducer of this invention.

In an alternative embodiment, drag reducer 10', FIG. 17, may be attached to frame 26' such that panel 16' is attached to frame 26' on the side of frame 26 adjacent latch mechanism 25' and opposite hinges 22', 24'. In this configuration, panel 16' folds over panel 14' and any top or bottom panels which may be included.

The drag reducer should be well marked with reflective material to warn drivers of other vehicles of the increased length of the vehicle. "Conspicuosity tape" may be applied to the rectangular perimeter and the diagonal seams of the bag. Various reflectors may also be attached to the outer surface of the bag for increased visibility. An electrical system may be provided to supply the electricity to the lights on the surface of the bag for increased nighttime visibility. The flexible electrical cord connects to the truck's electrical system in the rear corner of the underside of the trailer near the truck tail's hinges. It connects to the truck tail at the bottom of the tubular member attached to the hinges. There should be enough flexible power cord to accommodate both the deployed and the stowed configurations of the truck tail. Once inside the tube, the electrical wires are run through the tubes to appropriate points where they emerge to the outside of the frame between the skirt and bladder. The wires then pass through appropriate batten sleeves or electrical wiring sleeves in the skirt and outer covering of the bladder to the points where the electrical devices are located. These devices may include brake lamps, turn signal lamps, clearance lamps, tail lamps, hazard warning flashing lamps, identification lamp, and possibly a license plate lamp.

The panels of fabric making up the outer bag could be made out of a stiff enough material to not need any battens. The outer panel, especially, could be made stiff enough without battens to support the weight needed to prevent sagging.

The preferred inflated truck tail is elongated in the vertical axis, with the bottom panel of the bag being almost horizontal. This shape is based on the assumption that the air streams along the top and the sides of the trailer will tend to be more laminar and less turbulent than the air emerging from under the truck, and would therefore be more susceptible to being influenced by the airfoil of the truck tail.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A drag reducer comprising:
    a frame hinged to the rear of a vehicle and operable between a operable between a position adjacent to the rear of the vehicle and a position swung away from the rear of the vehicle thereby providing access to the rear of the vehicle; and
    an inflatable bag attached to the frame and operable between a deployed inflated configuration when the frame is positioned adjacent the rear of the vehicle and a stowed deflated configuration both when the frame is positioned adjacent the rear of the vehicle and also when the frame is swung away from the rear of the vehicle, the inflatable bag including:
        at least first and second converging panels defining an aerodynamic drag reducing structure in the deployed inflated configuration, the first panel foldable over the second panel when the bag is in the deflated stowed configuration to control the bag in the deflated stowed configuration and also to assist in configuring the bag in the stowed deflated configuration.

2. The drag reducer of claim 1 in which the inflatable bag is unitary in construction.

3. The drag reducer of claim 1 in which the inflatable bag includes an inflatable bladder surrounded by a covering.

4. The drag reducer of claim 1 further including battens framing the first panel.

5. The drag reducer of claim 4 in which the battens are flexible along their longitudinal axis and inflexible off axis.

6. The drag reducer of claim 1 in which the frame has four sides and the bag has a top panel, a bottom panel, and two side panels, one side panel extending from the hinged side of the frame and being foldable over the other side panel and the top and bottom panels, all said panels converging at a distal portion of the bag.

7. The drag reducer of claim 6 in which the bag further includes a base panel spanning the frame forming a proximal portion of the bag adjacent the vehicle.

8. The drag reducer of claim 1 in which the frame is hinged to a side of the rear of the vehicle.

9. The drag reducer of claim 8 in which there are a plurality of hinges interconnecting the frame and the side of the rear of the vehicle.

10. The drag reducer of claim 9 in which said hinges are double hinges.

11. The drag reducer of claim 1 further including a fill port in the bag for inflating the bag.

12. The drag reducer of claim 11 further including means for automatically inflating the bag.

13. The drag reducer of claim 1 in which the first panel is biased into a folded position.

14. The drag reducer of claim 13 including at least one spring member connected to the first panel to bias it in the folded position.

15. The drag reducer of claim 6 in which all the panels are biased into a folded position.

16. The drag reducer of claim 15 in which a spring member is connected to the top panel to bias it downward, a spring member is connected to the bottom panel to bias it upward, and there is a spring member connected to each side panel to bias them inward.

17. The drag reducer of claim 1 in which the bag further includes a skirt connected to the frame to provide stress relief for the inflatable portion of the bag.

18. The drag reducer of claim 1 in which the first panel has a length equal to or less than the extent of the frame.

19. A drag reducer comprising:
    a four sided frame having one side hingeable to the rear side of a vehicle and operable between a position adjacent the rear of the vehicle and a position swung away from the rear of the vehicle thereby providing access to the rear of the vehicle; and
    an inflatable bag attached to the frame and operable between a deployed inflated configuration when the frame is positioned adjacent the rear of the vehicle and a stowed deflated configuration both when the frame is positioned adjacent the rear of the vehicle and when the frame is swung away from the rear of the vehicle, the inflatable bag including:
        panels which extend outward from the frame and which converge at a distal portion defining an aerodynamic drag reducing structure, one said panel being a dominant panel and biased to fold over the other panels so that when the bag is deflated it is automatically self-stowing.

20. The drag reducer of claim 19 in which there is a top panel, a bottom panel, and two side panels, one of which is the dominant panel.

21. The drag reducer of claim 20 in which the dominant panel extends from the hinged side of the frame.

22. The drag reducer of claim 20 in which at least one spring member is connected to the dominant panel to bias it in the folded position.

23. The drag reducer of claim 22 in which spring members are connected to the top, bottom, and non-dominant side panel to bias them into a folded position under the dominant panel.

24. The drag reducer of claim 19 in which the dominant panel has a length equal or less than the extent of the frame.

25. The drag reducer of claim 19 in which the dominant panel is framed by batten members.

26. The drag reducer of claim 25 in which the batten members are flexible along their longitudinal axis and inflexible off axis.

27. The drag reducer of claim 19 in which the bag further includes a skirt connected to the frame to provide stress relief for the inflatable portion of the bag.

28. The drag reducer of claim 19 in which the bag is unitary in construction.

29. The drag reducer of claim 19 in which the bag includes an inflatable bladder surrounded by a covering.

30. The drag reducer of claim 19 in which there are a plurality of hinges interconnecting the frame and the side of the rear of the vehicle.

31. The drag reducer of claim 30 in which said hinges are double hinges.

32. The drag reducer of claim 19 further including a fill port in the bag for inflating the bag.

33. The drag reducer of claim 19 further including means for automatically inflating the bag.

34. A tractor trailer truck with cargo doors on the rear of the truck and a drag reducer attached to the rear of the truck, the drag reducer comprising:

a frame hingably attached to the rear of the truck and operable between a position adjacent the cargo doors and a position swung away from the rear of the truck thereby providing access to the cargo doors; and an inflatable bag attached to the frame and operable between a deployed inflated configuration when the frame is positioned adjacent the cargo doors and a stowed deflated configuration both when the frame is positioned adjacent the cargo doors and when the frame is swung away from the rear of the truck, the inflatable bag including:

at least first and second panels which extend outward from the frame, said at least first and second panels defining an aerodynamic drag reducing structure in the deployed inflated configuration, the first panel being biased to fold over the second panel in the stowed deflated configuration.

35. A drag reducer comprising:

a frame attached to the rear of the vehicle and operable between a position adjacent the rear of the vehicle and a position swung away from the rear of the vehicle to provide access to the rear of the vehicle; and an inflatable bag attached to the frame and operable between a stowed deflated configuration and deployed inflated configuration, the bag being in the stowed deflated configuration when the frame is adjacent the rear of the vehicle, the bag being deployable to the deployed inflated configuration when the frame is adjacent to the rear of the vehicle and the vehicle is moving, and the bag being stowable in the stowed deflated position when the frame is swung away from the rear of the vehicle, the bag including:

at least first and second converging panels defining an aerodynamic drag reducing structure in the deployed inflated configuration, the first panel foldable over the second panel in the stowed deflated configuration to control the bag and to assist in configuring the bag in the stowed deflated configuration.

* * * * *

UNITED STATES PATENT AND TRADEMARK OFFICE
CERTIFICATE OF CORRECTION

PATENT NO.    : 6,467,833 B1
DATED         : October 22, 2002
INVENTOR(S)   : Richard H. Travers It is certified that error appears in the above-identified patent and that said Letters Patent is hereby corrected as shown below:

<u>Column 4,</u>
Line 14, please replace "comer" with -- corner --.
Line 45, please replace "comers" with -- corners --.

<u>Column 7,</u>
Line 17, please replace "between a operable between a position adjacent to the" with -- between a position adjacent to the --.

Signed and Sealed this

Fourth Day of March, 2003

JAMES E. ROGAN
*Director of the United States Patent and Trademark Office*